United States Patent [19]
Michler

[11] Patent Number: 6,032,558
[45] Date of Patent: Mar. 7, 2000

[54] ROTARY KNIFE WITH ACTIVE VIBRATION CONTROL

[75] Inventor: James R. Michler, Phillips, Wis.

[73] Assignee: Marquip, Inc., Phillips, Wis.

[21] Appl. No.: 09/045,466

[22] Filed: Mar. 20, 1998

[51] Int. Cl.[7] .......................... B23Q 15/18; B23Q 17/12
[52] U.S. Cl. .................................. 83/74; 83/342; 83/575; 83/698.21; 101/216; 384/448
[58] Field of Search .......................... 384/448; 101/216; 72/10.1, 13.4, 237; 83/72, 74, 75, 342, 344, 576, 745, 698.21

[56] References Cited

U.S. PATENT DOCUMENTS

| | | | |
|---|---|---|---|
| 1,318,892 | 10/1919 | Maier | 83/296 |
| 2,001,167 | 5/1935 | Swennes | 64/29 |
| 2,736,393 | 2/1956 | O'Connor | 188/1 |
| 2,942,534 | 6/1960 | Boddy | 93/58.2 |
| 3,075,406 | 1/1963 | Butler, Jr. et al. | 74/574 |
| 3,380,328 | 4/1968 | Martin | 83/156 |
| 3,570,348 | 3/1971 | Hallden | 83/342 |
| 3,845,827 | 11/1974 | Schulin | 173/162 |
| 4,125,073 | 11/1978 | Bain | 101/216 |
| 4,290,353 | 9/1981 | Pav et al. | 101/216 X |
| 4,364,293 | 12/1982 | Hirsch | 83/674 |
| 4,372,205 | 2/1983 | Pflaum | 101/216 X |
| 4,487,122 | 12/1984 | George et al. | 101/216 X |
| 4,487,123 | 12/1984 | Kobler et al. | 101/216 |
| 4,548,112 | 10/1985 | Thomas | 83/345 |
| 4,756,219 | 7/1988 | Pohl et al. | 83/344 |
| 4,809,573 | 3/1989 | Welch | 73/72 X |
| 5,022,201 | 6/1991 | Kobori et al. | 52/167 |
| 5,048,387 | 9/1991 | Niitsuma et al. | 83/344 |
| 5,421,129 | 6/1995 | Sakamoto et al. | 52/167.1 |
| 5,447,001 | 9/1995 | Nishimura et al. | 52/167.2 |
| 5,596,931 | 1/1997 | Rössler et al. | 101/484 |
| 5,720,210 | 2/1998 | Okahashi | 83/698.21 X |
| 5,724,846 | 3/1998 | Wang et al. | 72/13.4 X |
| 5,752,404 | 5/1998 | White et al. | 72/237 X |

FOREIGN PATENT DOCUMENTS

| | | |
|---|---|---|
| 555010 | 12/1975 | Russian Federation . |

OTHER PUBLICATIONS

"The Direct Drive Cutoff Knife", Marquip brochure, D.D.C.O.—4 May 25, 1984, Marquip Inc., 1984.

*Primary Examiner*—Rinaldi I. Rada
*Assistant Examiner*—Charles Goodman
*Attorney, Agent, or Firm*—Andrus, Sceales, Starke & Sawall

[57] ABSTRACT

A rotary knife incorporates the use of an electronically controlled, tuned mass active damping system to control vibrations of the knife cylinder. The system preferably uses one or more electromagnetic actuators to provide force on a tuned mass which is mechanically coupled to the knife cylinder. Vibration sensors, preferably accelerometers, are used to monitor vibrations of the respective knife cylinders and tuned masses. A digital signal processor implementing a state space control system controls the electromagnetic actuators to remove vibration energy from the system. An active damping system in accordance with the invention is more effective in removing vibration energy than passive systems, especially in heavy-duty applications.

51 Claims, 8 Drawing Sheets

ROTARY KNIFE WITH ACTIVE VIBRATION CONTROL

FIELD OF THE INVENTION

The invention relates to controlling vibration of knife cylinders in rotary knives which are used to cut individual sheets in succession from a longitudinally traveling continuous web of material, such as corrugated paperboard. In particular, the invention involves the use of an electronically controlled, tuned mass active damping system.

BACKGROUND OF THE INVENTION

In the corrugated paperboard industry, long machines comprised of several components are used to make individual pieces of corrugated paperboard from rolls of kraft paper and adhesive. In these machines, a rotary knife is used to cut a continuous web of corrugated paperboard into individual sheets towards the end of the manufacturing process. These individual sheets of corrugated paperboard are then normally stacked and transported for finishing. The quality of the individual sheets and in turn the quality of the end product made from the corrugated sheets depends in large part on the performance of the rotary knife.

In a typical rotary knife, a pair of rotating knife cylinders extend generally transverse across the web. The outer cylindrical wall of each cylinder includes a straight cutting blade that is helically mounted to the respective cylinder. Gears for the cylinders ensure that the cylinders rotate symmetrically so that the blades engage the web and each other to cut the web transversely in a scissors-like fashion. In order to provide a high quality cut, it is important that the blades tightly engage one another when making the scissors cut. A control system for the knife precisely controls the speed of the rotating cylinders so that the forward velocity of the blades during the cut matches the forward velocity of the web through the knife. In addition, the desired length of the individual sheets for the particular order is regulated by controlling the speed of the rotating cylinders when the blades are not engaged, which is in general a different speed than when the blades are engaged to make the cut. This type of variable speed operation is conventional in the art.

Due to the above-described variable speed operation, low inertia rotary knives are used by the assignee of the present application primarily to improve motor drive control and durability. In these low inertia rotary knives, an upper stationary support shaft and a lower stationary support shaft are mounted to the knife frame (normally using retainer mounts). An upper rotatable cylindrical tube is placed concentrically over the upper stationary support shaft and a lower rotatable cylindrical tube is placed concentrically over the lower stationary support shaft. The knife blades are attached to the outer wall of the rotatable cylindrical tubes. Bearings are located between the rotatable cylindrical tubes and the respective stationary support shaft. The rotational inertia of the tubular knife cylinders is significantly less than in systems having solid rotating knife cylinders.

In low inertia rotary knife systems, as well as other rotary knife systems, excessive vibration of the knife cylinders can cause poor quality cuts. Under extreme conditions, the vibrations can sometimes even prevent cuts from occurring altogether. It has been found that cutting frequency has a substantial effect on the amount of steady state vibration, and hence the quality of the cut. The knife cylinder assemblies have certain frequencies at which natural dampening characteristics are insufficient to overcome repeated impulse forces from the engagement of the knife blades. This is especially true when the frequency of the cutting cycle is in sync with the vibration. Vibration problems are more apparent when the knife is operating at high speeds because there is less time for natural damping to occur between cutting cycles. In addition, vibration problems are more apparent on webs that require relatively high cutting forces.

SUMMARY OF THE INVENTION

The invention is a rotary knife that incorporates the use of an electronically controlled, tuned mass active damping system to control vibrations of the knife cylinder. The system preferably uses one or more electromagnetic actuators to provide a force on a tuned mass which is mechanically coupled to the knife cylinder. An active damping system in accordance with the invention is more effective in removing vibration energy than passive systems, especially in heavy-duty applications.

In the preferred embodiment of the invention, the system is used to actively damp vibrations of a low inertia rotary knife. The system includes a spring arm that has one end mounted to the retainer mount for the stationary support shaft of the knife cylinder. As mentioned, the retainer mount fixes the stationary support shaft to the frame of the rotary knife. A tuned mass is mounted to the opposite end of the spring arm. The spring arm and tuned mass are preferably tuned to a frequency slightly lower than the natural resonance frequency of the knife cylinder. One vibration sensor, preferably an accelerometer, monitors vibrations of the knife cylinder, and another monitors vibrations of the tuned mass. Signals from the accelerometers are transmitted to an electronic control unit which outputs a command signal. The command signal drives the electromagnetic actuator to provide a force on the tuned mass and actively dampen vibrations in the knife cylinder.

The electronic control unit is preferably a digital signal processor implementing a state space control system. The preferred state space control system generates the command signal for the sample time period k to drive the electromagnetic actuator based on the estimated position and velocity of the cylinder vibration sensor and the tuned mass vibration sensor at sampling time period k. Mathematically, the preferred controller is a linear combination. The controller is preferably determined using the Ricatti Equation as is known in the art to provide a linear combination that adequately models the behavior of the system with the tuned mass attached. In the preferred embodiment of the invention, the control scheme accounts for phase shifts in the system (for example, phase lags in the electromagnetic actuator, processing electronics, etc.) by using adjusted control coefficients in the state space control algorithm. The preferred control scheme is disclosed in copending patent application Ser. No. 09/046,267 filed on Mar. 23, 1998, entitled "Phase Shift Accommodator For Active Tuned Mass Damping System" by James Michler, assigned to the assignee of the present application, and incorporated herein by reference. The command signal is scaled and then output from the electronic control unit to drive the electromagnetic actuator which provides force on the tuned mass to actively damp vibrations in the knife cylinder.

As mentioned above, the vibration sensors are preferably accelerometers. Accelerometers are used in lieu of other types of sensors because accelerometers are placed directly within the respective components, and the output of the accelerometers is not skewed by the relative motion and/or velocity of other components in the monitoring system. The cylinder accelerometer measures the instantaneous acceleration of the stationary support shaft. The state space control system includes an observer that estimates cylinder position and velocity for a particular sample period k+1 based on a linear combination of the acceleration measured during the sample period k+1 and the position and the velocity calculated for the previous sample period k (e.g. separate customized linear combinations to predict position and velocity for sample period k+1). The observers for estimating cylinder position and velocity are selected in a manner to provide suitable convergence (e.g. 90% convergence to actual values within 10 milliseconds at a 4,000 Hz sample rate), and yet provide slow enough adaptation to effectively filter random noise in the accelerometer signal from substantially affecting the estimated velocity and position values. In a similar manner, the estimated position and velocity of the tuned mass are calculated from the tuned mass accelerometer signal. The observer for the tuned mass (i.e. the linear combinations) is preferably the same or similar to the observer used for the knife cylinder, as long as the same types of sensors are used.

In light-duty applications (e.g. thin or easy to cut corrugated paperboard), vibration in the horizontal direction dominates. However, in heavy-duty applications (e.g. thicker or hard to cut corrugated paperboard), vibration in the vertical direction tends to dominate. It has been found that control of horizontal vibrations is largely independent of control of vertical vibrations, that is, horizontal vibrations are linearly independent of vertical vibrations. Thus, two separate yet similar state space control systems can be implemented contemporaneously on the same digital signal processor to independently control both horizontal vibrations and vertical vibrations. In such a system, it is preferred that a pair of orthogonally mounted sensors be used to monitor vibrations of the knife cylinder, whereas another orthogonal pair of accelerometers be used to monitor vibrations of the tuned mass. Such a system also preferably includes a pair of orthogonally mounted electromagnetic actuators.

Such a tuned mass active damping system (i.e. either one-dimensional for machines operating in light-duty applications only, or two-dimensional for other applications) can be applied to either one of the knife cylinders, or preferably to both of the knife cylinders. In a system implemented on both knife cylinders for a rotary knife, it may be desirable to use a common digital signal processor. Also, as long as the vibration characteristics of the respective knife cylinders are similar, it would be desirable to use the same configuration for the spring arm and tuned mass, the electromagnetic actuators, and the state space control system implemented on the electronic control unit. Note, however, that physical differences may require suitable modifications.

In another aspect of the invention, the tuned mass is preferably a plurality of laminated steel plates. The steel plates are aligned in the direction of the magnetic field from the respective electromagnetic actuators. In this manner, eddy currents transverse to the direction of the magnetic field are not allowed to propagate for substantial distances, and thus are prevented from generating excessive heat in the tuned mass. This is important because the tuned mass will typically be housed within a cabinet for the rotary knife, and it is not desirable to overheat the knife drive and control components located within the cabinet.

In addition, it is preferred to have permanent magnets embedded in the surface of the tuned mass at locations corresponding to the legs of the respective electromagnetic actuators. In this manner, a single electromagnetic actuator can be used to both push and pull the tuned mass in the selected direction. The permanent magnets are fixed to the tuned mass using an adhesive. Reducing heat in the tuned mass by use of the laminated steel plates helps to prevent premature deterioration of the adhesive.

A tuned mass active damping system as disclosed herein has several advantages over passive tuned mass damping systems. First, passive tuned mass damping systems are tuned for exactly one frequency which is normally a compromise between the optimal natural frequency for vertical vibrations and the optimum natural frequency for horizontal vibrations. Active control allows the tuned mass damping system to be tuned differently in the vertical and horizontal directions to compensate for differences in natural frequencies. Secondly, the frame on many rotary knives is thick and substantially rigid, and thus tends to decouple the tuned mass from the knife cylinder which reduces its effectiveness on reducing vibrations in passive systems. While a passive tuned mass damping system may be effective on systems having relatively thin frames (e.g. ⅞ of an inch steel), passive systems are not effective on knives having relatively thick frames (e.g. 1.5 inch thick steel) because, as explained, thick frames effectively decouple the tuned mass from the knife cylinder. An active control system in accordance with the invention can overcome the decoupling affect of thick frames.

Other features and advantages of the invention may be apparent to those skilled in the art upon inspecting the following drawings and description thereof.

DETAILED DESCRIPTION OF THE DRAWINGS

Figure 1:
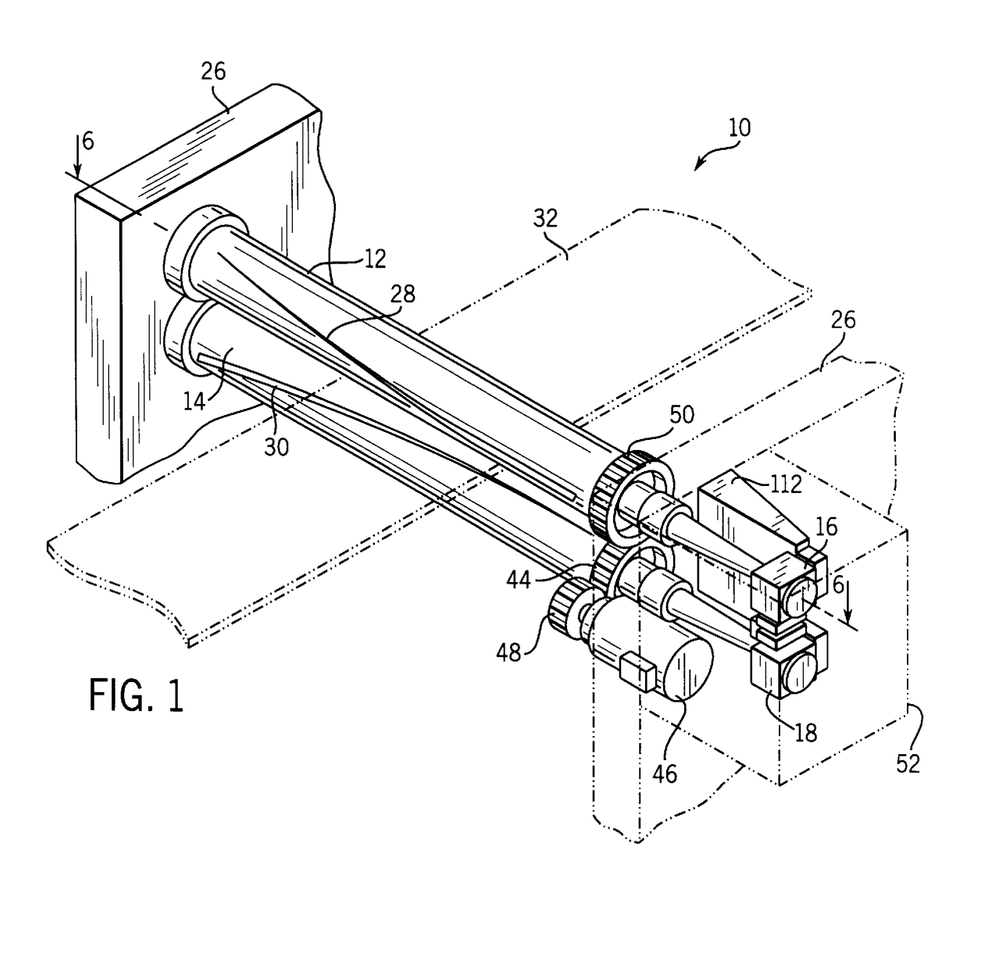
FIG. 1 is a perspective view of a rotary knife used to cut individual sheets in succession from a longitudinally traveling continuous web of material, the rotary knife incorporating an active vibration damping system in accordance with the invention.

FIG. 1 shows a rotary knife 10 having an upper knife cylinder 12 and a lower knife cylinder 14 as well as an active tuned mass damping system 16 for the upper knife cylinder 12 and an active tuned mass damping system 18 for the lower knife cylinder 14. The knife cylinders 12, 14 each comprise a stationary support shaft 20, 22 (see FIG. 7) and a tubular knife cylinder 21, 23 mounted to rotate around the respective stationary support shaft 20, 22 via bearings 24, 25. The ends of the stationary support shafts 20, 22 are mounted to the knife frame 26. The details of the mounting the knife cylinders 12, 14 to the frame 26 are discussed in detail below. Referring still to FIG. 1, a helical cutting blade 28 is mounted to knife cylinder 12, and a mating helical cutting blade 30 is mounted to knife cylinder 14. The helical blades 28, 30 engage each other as the tubular knife cylinders 12, 14 rotate to cut the continuous web 32 into successive individual sheets.

The lower cylinder 14 is provided with a drive gear 44 at one end of the cylinder 14 near the frame 26. An electrically powered motor 46 powers gear 48 which engages gear 44 on the lower cylinder 14 to rotate the lower cylinder 14. An electronic controller controls the speed of the motor 46 to control the speed of rotation of the lower gear 14. The upper knife cylinder 12 also includes a drive gear 50 at one of the ends of the cylinder 12. In the system shown in the drawings, drive gear 50 on the upper cylinder 12 engages drive gear 44 on the lower cylinder 14 so that the upper knife cylinder 12 and the lower knife cylinder 14 are driven contemporaneously by electric motor 46. While the drawings show one particular drive system for the rotary knife 10, various other drive systems may be used in accordance with the invention. For instance, a cluster of electric drive motors may be used to drive the lower 14 and upper 12 knife cylinders contemporaneously, or a separate electric drive motor may be used to drive the upper knife cylinder 12.

A box 52 is mounted to the frame 26 to cover the electric motor 46, the active tuned mass dampers 16, 18 and, if desired, an electronic controller (not shown) such as a digital signal processor. Alternatively, the electronic controller can be located remotely from the rotary knife 10.

Figure 2:
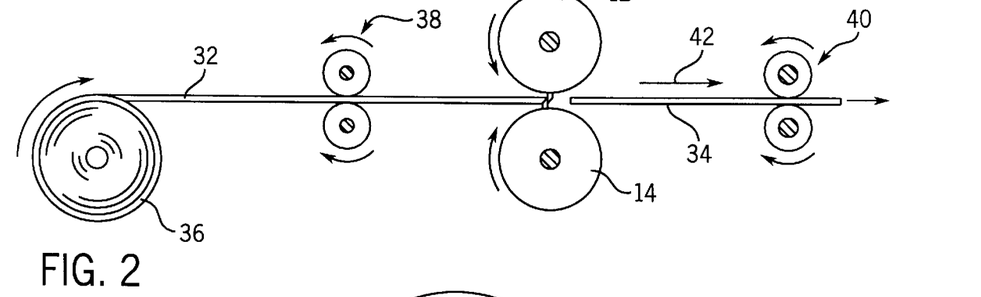
FIG. 2 is a schematic view illustrating the cutting of individual sheets in succession from a traveling continuous web on the rotary knife shown in FIG. 1.
Figure 3:
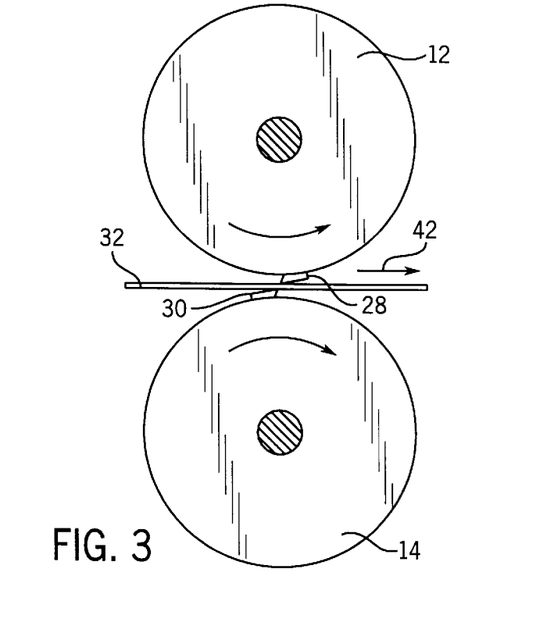
FIG. 3 is an enlarged end view showing the cutting of the web by a pair of knife cylinders.
Figure 4:
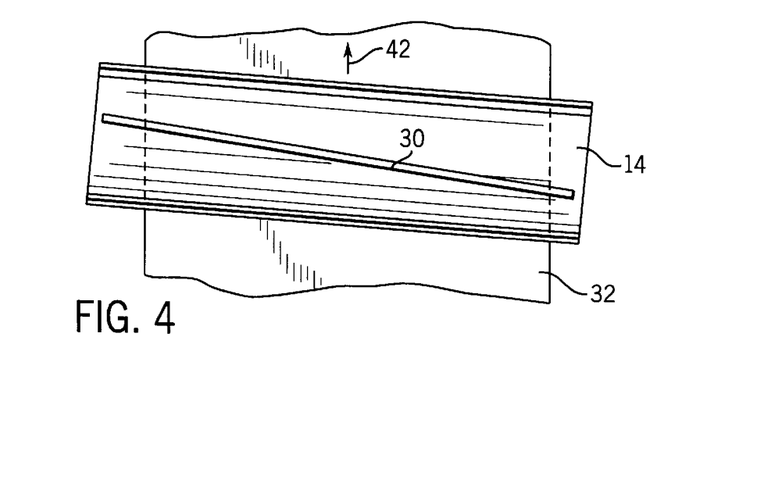
FIG. 4 is a top plan view of the bottom knife cylinder shown in FIG. 3 which illustrates the orientation of the knife cylinder with respect to the continuous web.

FIGS. 2 through 4 schematically illustrate the general concept of cutting separate sheets 34 in succession from the web 32. In FIG. 2, the web 32 is continuously fed from a supply roll 36 through a pair of drive nip rollers 38 into the rotating knives 12, 14 which cut the web 24 into successive individual sheets 34. Another pair of drive nip rollers 40 transports the individual cut sheets downstream to be processed, for instance, by a stacking device. It is typical for the drive nip rollers 40 to operate at a higher speed than the drive nip rollers 38 located upstream of the knife 10. While FIG. 2 shows the web 32 being supplied by roll 36, it should be apparent to those skilled in the art that the continuous web 32 may be supplied to the drive nip rollers 38 by some other type of web manufacturing and/or processing equipment such as a slitter/scorer as is conventional in the art.

The cylinders 12, 14 are disposed generally transverse to the web 32, see FIG. 4. In FIG. 4, the web 32 is moving in the direction of arrow 42. As shown in FIG. 3, the knife blades 28, 30, engage in a scissors-like fashion to cut the web 32 transversely. The knife cylinders 12, 14 are skewed slightly as shown in FIG. 4 to compensate for the relationship of the helical cutting blades 28, 30 with respect to the continuous web 32, thus maintaining a straight transverse cut across the web 32.

When the helical blades 28, 30 engage each other in a scissors-like fashion to cut the web 32, it is important that the blades 28, 30 be moving at the same linear speed as the forward speed of the web 32 in the direction of arrow 42. In order to adjust the length of the individual sheets 34 cut in succession from the continuous web 32, the relative rotational speed of the knife cylinders 12, 14 with respect to the forward speed of the web 32 in the machine direction 42 is varied for the period of the cycle when the blades 28, 30 are not engaged with the web 32.

Figure 5A:
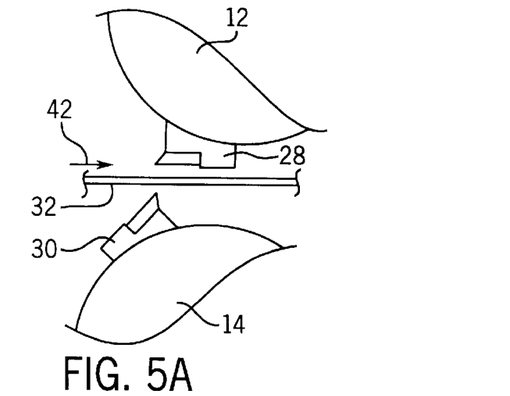
FIGS. 5A through 5F are detailed schematic views showing the cutting process of the continuous web into individual sheets by the rotary knife.
Figure 5B:
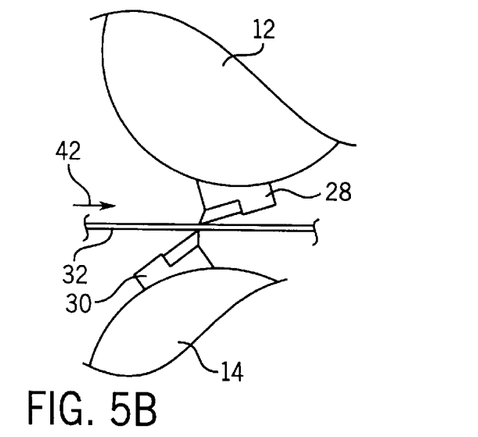
Figure 5C:
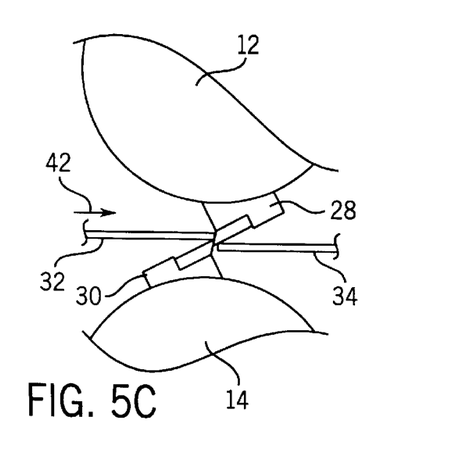
Figure 5D:
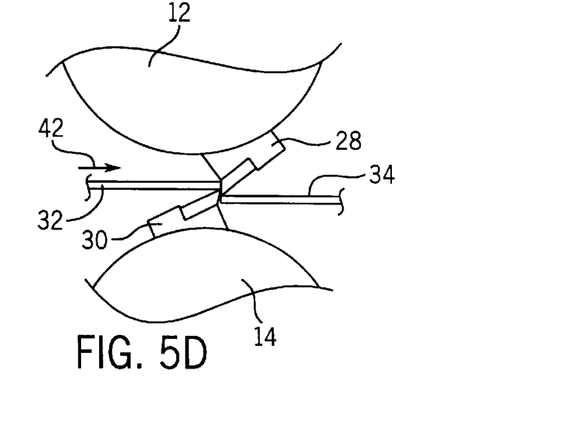
Figure 5E:
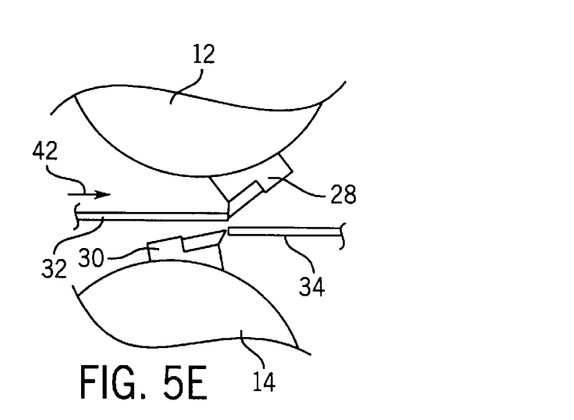
Figure 5F:
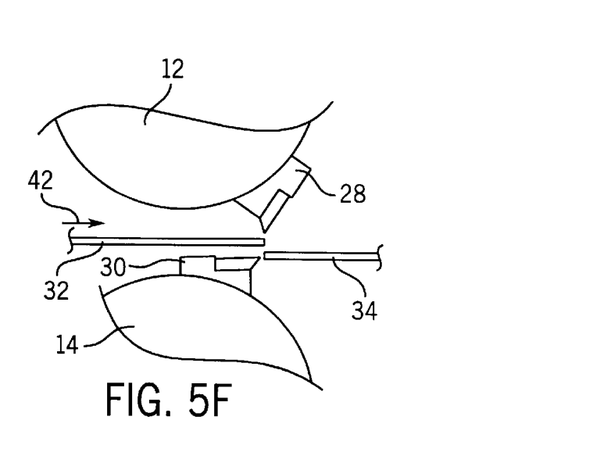

FIGS. 5A through 5F show the cutting process by blades 28, 30 in the rotary knife 10 in detail. In FIGS. 5A through 5F, the knife cylinders 12, 14 are shown at various stages of rotation from just prior to the engagement of the knives 28, 30 with the web 32, FIG. 5A, to just after the engagement of the helical knives 28, 30 after the cut is made. FIG. 5A shows the helical blades 28, 30 just prior to the instant when the blades 28, 30 initially engage the web 32. FIG. 5B shows the blades 28, 30 initially engaging the web 32. As explained above, substantial vertical impulse forces causing vibration in the vertical direction can occur when the cutting blades 28, 30 impact and cut the web 32. Vertical vibrations tend to dominate when the web 32 is thicker or hard to cut, such as may be the case with relatively thick corrugated paperboard. FIGS. 5C and 5D show the helical blades 28, 30 cutting the web 32 to create the individual sheets 34. When making the scissors-like cut, it is important that the blades 28, 30 remain in tight engagement to create a clean cut as shown in FIGS. 5C and 5D. Due to this tight engagement, horizontal impulse forces often occur between the blades 28, 30, which can cause vibrations in the horizontal direction. In light duty applications, for example thin or easy to cut webs, horizontal vibrations tend to dominate. FIGS. 5E and 5F show the helical blades 28, 30 just after the individual sheet 34 is cut from the web 32. Note that the individual sheet 34 is not displaced with respect to the continuous web 32 in the machine direction by the cutting of the web 32.

The extent of vertical and horizontal vibrations in the rotary knife 10 is dependent on several factors, including: the structural design of the rotary knife cylinders 12, 14, the mounting of the knife cylinders 12, 14 to the knife frame 26, the rigidity of the frame 26, the properties of the continuous web being cut, and the speed and/or speeds of operation, etc. Testing on exemplary rotary knives 10 has shown that significant vibration problems occur characteristically at certain machine speeds or frequencies for a given structural design, mounting configuration, type of web being cut, etc. Thus, absent some sort of vibration control, rotary knives are likely to produce poor cuts at certain speeds of operation due to excessive vibration. In accordance with the invention, one or more active tuned mass damping systems 16, 18 are used to control vibrations of the knife cylinders 12, 14 to ensure precise, effective cutting of the web 32.

Figure 6:
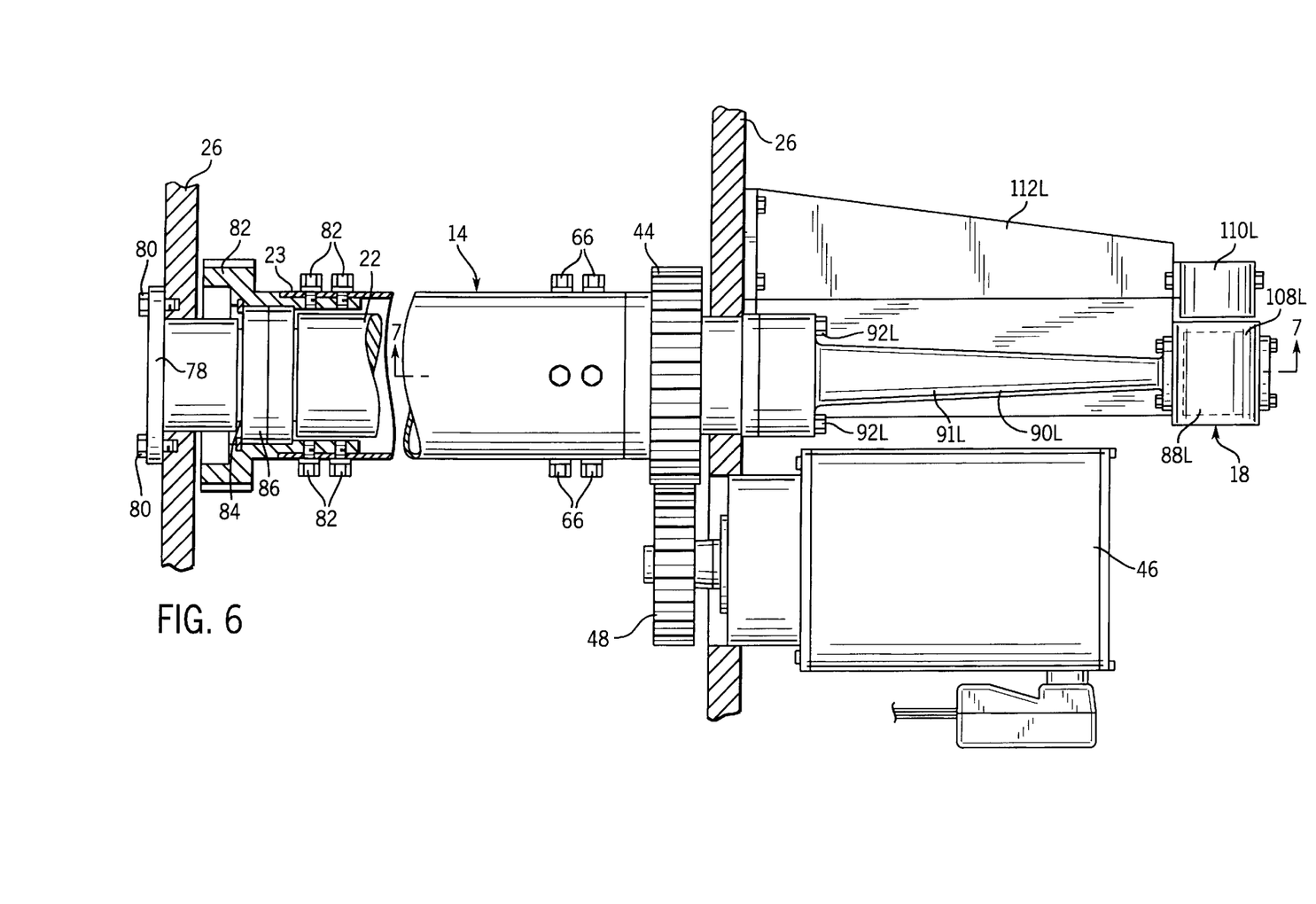
FIG. 6 is a detailed view of the active damping system for the rotary knife taken along line 6—6 in FIG. 1.
Figure 7:
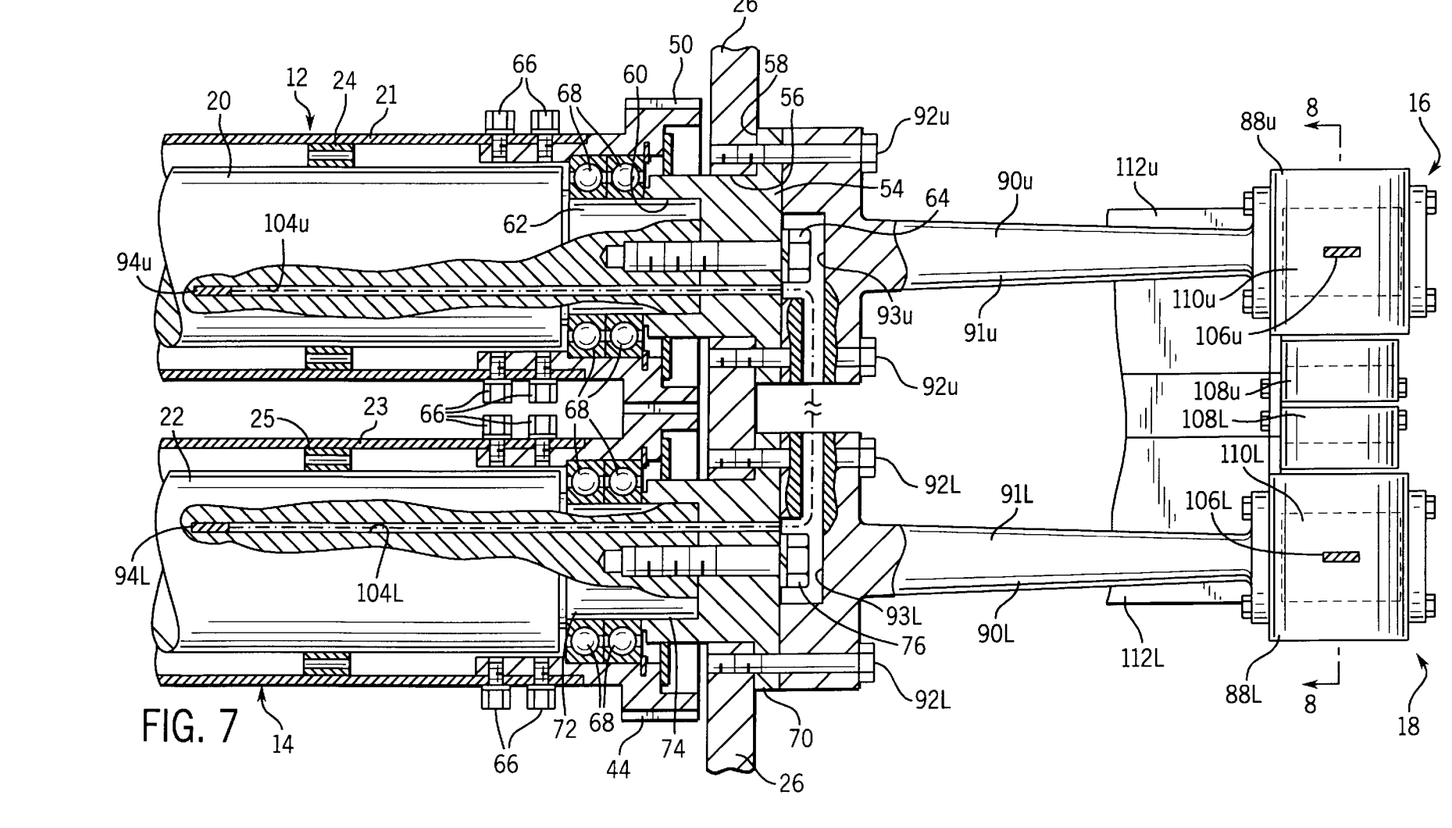
FIG. 7 is a detailed view of the active damping system taken along line 7—7 in FIG. 6.

Referring to FIGS. 6 and 7, the stationary shaft 20 for the upper knife cylinder 12 is mounted to the frame 26 on each end of the shaft 20 by a shaft retainer ring 54. The shaft retainer ring 54 is seated securely through an opening 56 in the knife frame 26. The retainer ring 54 includes a shoulder 58 that abuts the outside surface of the frame 26. The retainer ring 54 also includes a cylindrical recess 60 that opens to the inside of the frame 26. The end of the stationary shaft 20 includes a cylindrical stub 62 that seats in the cylindrical recess 60 on the retainer ring 54 to secure the stationary shaft 20 to the frame 26. A mounting bolt 64 secures the stationary support shaft 20 to the retaining ring 54. Drive gear 50 for the upper knife cylinder 12 is attached to the rotatable tube 21 for the upper knife cylinder 12 via a plurality of screws 66. The drive gear 50 is supported for rotation on the cylindrical stub 62 at the end of the stationary support shaft 20 by bearings 68.

The mounting of the lower knife cylinder 14 to the knife frame 26 is preferably identical to the mounting of the upper knife cylinder 12 to the frame 26. Briefly, cylindrical recess 74 in retainer ring 70, FIG. 7, receives the cylindrical stub 72 on the end of the stationary shaft 22 for the lower knife cylinder 14. Mounting bolt 76 secures the retainer ring 70 and the stationary shaft 22 to the frame 56. Drive gear 44 is mounted to the rotatable tube 23 for the lower knife cylinder 14 via a plurality of screws 66. The drive gear 44 is rotatably supported on the cylindrical stub 72 at the end of the stationary shaft 22 by bearings 68.

Referring in particular to FIG. 6, the other end of the stationary support shaft 22 for the lower knife cylinder 14 is supported to the knife frame 26 by a retainer ring 78 that is secured to the frame 26 by bolts 80. A rotatable gear 83 is attached to the rotatable tube 23 via screws 82. The end of the stationary support shaft 22 has a cylindrical stub 84 that seats in a cylindrical recess in the welded retaining ring 78. The rotatable gear 83 is rotatably supported on the cylindrical stub 84 via bearings 86. Although not shown specifically in the drawings, the mounting of the upper knife cylinder 12 to this end of the knife frame 26 is preferably done in a similar or identical manner.

In the system shown in the drawings, the active tuned mass damping system 16 for the upper knife cylinder 12 is identical to the active tuned mass damping system for the lower knife cylinder 14. As previously explained, however, it may be desirable to modify the upper 16 or lower 18 active tuned mass damping systems depending on the specific configuration for the rotary knife and the respective cylinders 12, 14, mounting arrangements, etc. The following description with respect to FIGS. 6 through 8 focuses primarily on the active tuned mass damping system 18 for the lower knife cylinder 14, although it should be understood that the active tuned mass damping system 16 for the upper knife cylinder 12 is similar in many if not all respects.

The active tuned damping system 18 for the lower knife cylinder 14 includes a tuned mass 88L which is mounted to a spring arm 90L. The spring arm 90L and the tuned mass 88L are mounted to the retainer ring 70 for the lower cylinder 14 and the frame 26 via bolts 92L. The spring arm 90L and the tuned mass 88L are mechanically coupled to the stationary support shaft 22 for the lower cylinder 14 in this manner. It is preferred that the combination of the spring arm 90L and the tuned mass 88L be selected so that the tuned frequency is slightly less than the natural resonance frequency of the system for the lower knife cylinder 14 absent the tuned mass 88L and spring arm 90L (e.g. tuned within 2% of the natural resonance frequency of the system absent the spring arm and tuned mass). The spring arm 90L has a tapered stem 91L to facilitate system performance. The spring arm 90L also includes a cavity 93L at the base of the spring arm 90L to provide clearance for the mounting bolt 76.

In the prototype system, the natural frequency of the system absent the spring arm 90 and tuned mass 88 is roughly 50 Hz. In this prototype system, it has been found desirable to tune the system with the spring arm 90 and tuned mass 80 to about 1–2 Hz below the natural frequency of the system without the spring arm 90 and tuned mass 88 attached.

Figures 9, 10:
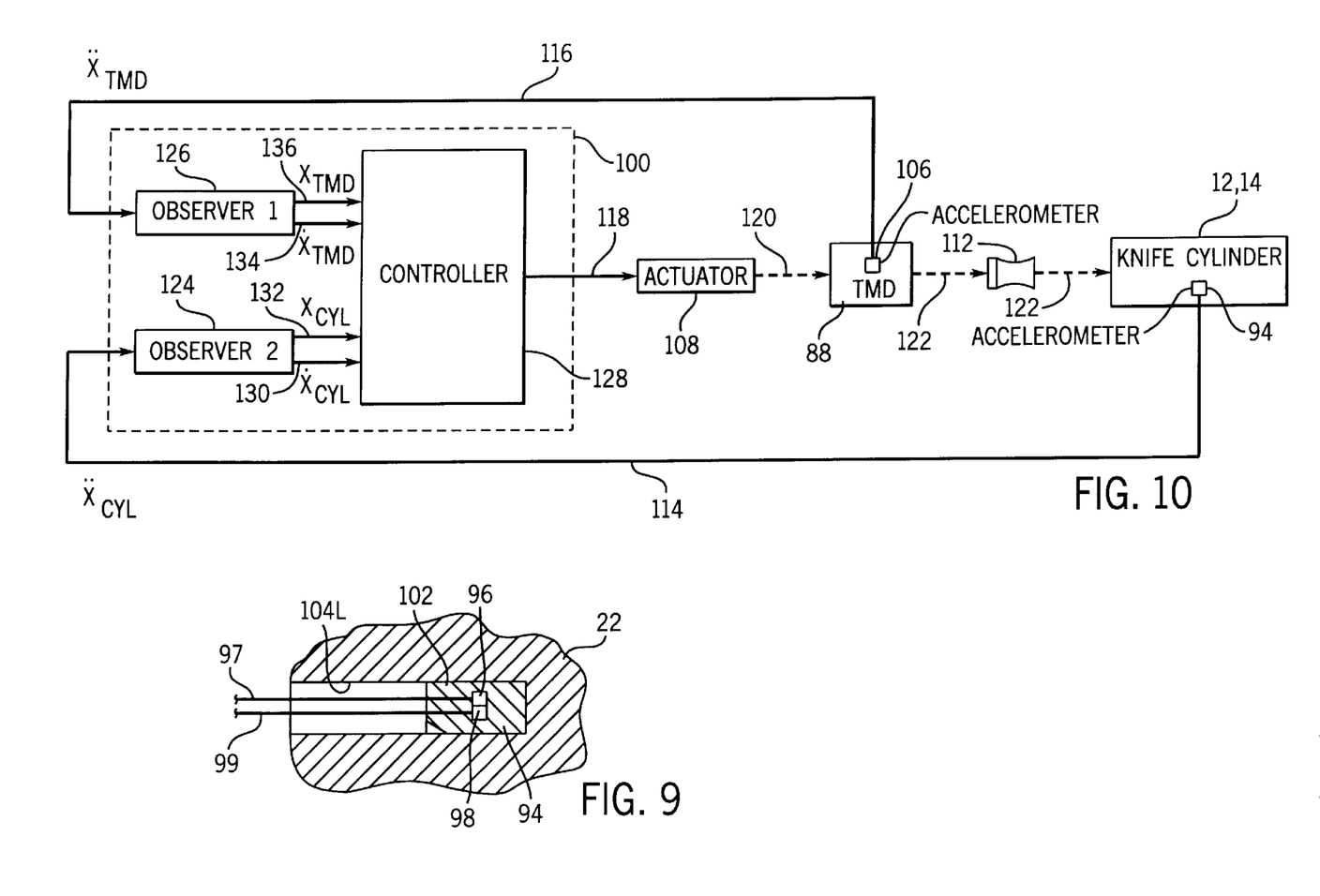
FIG. 9 is a detailed view illustrating the mounting technique for accelerometer vibration sensors used to implement the invention in its preferred embodiment.
FIG. 10 is a schematic drawing illustrating the preferred control system for a one-dimensional active tuned mass vibration damping system in accordance with the invention.

A potted sensor element 94L is located within the stationary support shaft 22 for the lower cylinder 14. The potted sensor element 94L is shown in detail in FIG. 9. The potted sensor element 94L preferably includes two accelerometers 96, 98, each providing an electrical lead 97, 99 to an electronic controller such as digital signal processor 100, FIGS. 10 and 11. The purpose of the accelerometers 96, 98 is to measure the vibration of the stationary shaft 22. Preferably, the accelerometers 96, 98 are mounted orthogonally to one another. Even more preferably one of the accelerometers, for example accelerometer 96, measures acceleration in the vertical direction whereas the other accelerometer, for example accelerometer 98, measures vibration in the horizontal direction. It is not necessary, however, that the accelerometers 96, 98 measure orthogonal vibrations. Rather, the invention can be implemented effectively to attenuate vibrations in two dimensions as long as the accelerometers 96, 98 measure vibrations in linearly independent directions and that are rotated at least 45° from one another. Under these conditions, suitable monitoring performance can be achieved using appropriate algorithms in the digital signal processor 100. In implementing an active tuned mass damping system for attenuating vibrations in a single direction, it may be necessary to use only one accelerometer 96 or 98. As shown in FIG. 9, the accelerometers 96, 98 are potted in a potting compound 102 such as an epoxy to fix the relative positions of the accelerometers 96, 98. The sensor element 94L is affixed with adhesive within a bore 104L in the stationary support shaft 22 for the lower cylinder 14. FIG. 7 schematically shows the bore 104L passing through the retainer ring 70 and into the stationary support shaft 22 off-center from the centerline of the stationary support shaft 22. In practice, it is desirable for the bore 104L to pass through the mounting bolt 76 and into the stationary support shaft 22 along the centerline of the stationary support shaft 22.

Since the purpose of the sensing element 94L is to monitor the vibrations of the lower knife cylinder 14, it is important that the sensor element 94A be located in a region within the stationary support shaft 22 that is effective for monitoring vibrations of the cylinder 14 and more specifically in a location that will sense the most significant vibrations over the normal operating range of the rotary knife 10. Preferably, the sensor element 94L is located approximately equidistant between the location at which the first end of the stationary support shaft 22, e.g. retainer ring 70, is affixed to the frame 26 and the location at which the other end of the stationary support shaft 22, e.g. retainer ring 78, is affixed to the frame 26. While this is the preferred location for the sensing element 94L, it has been found that the system works satisfactorily as long as the sensing element 94L is located at a location 20%–80% between the respective retainer rings 70, 78. If desired, additional or redundant sensor elements 94L can be used within the stationary support shaft 22, although this has not been necessary in the systems tested to date.

The active tuned mass damping system for the lower cylinder 14 also includes a sensor element 106L mounted within the tuned mass 88L to monitor the vibrations of the tuned mass 88L. The tuned mass sensor element 106L is similar to the sensor element 94L for the lower knife cylinder 14, but typically has lower sensitivity because of the higher vibration amplitudes.

The active tuned mass damping system 18 for the lower cylinder 14 also includes a pair of electromagnetic actuators 108L, 110L. Actuator 108L provides force on the tuned mass 88L in the vertical direction, whereas actuator 110L provides force on the tuned mass 88L in the horizontal direction. The electromagnetic actuators 108L, 110L are connected to an actuator mounting bracket 112L that is secured to the frame 26 of the rotary knife 10. In a one-dimensional system, it may not be necessary to include both actuators 108L, 110L, and the system can be implemented with a single actuator if desired.

As previously mentioned, the components for the active tuned mass damping system 16 for the upper cylinder 12 are similar and preferably identical to the components for the lower system 18. In FIG. 7, like components for the active tuned mass damping system for the upper cylinder 12 have been labeled with similar reference characters in which the letter U representing "upper" has been substituted for the letter L representing "lower".

Figure 8:
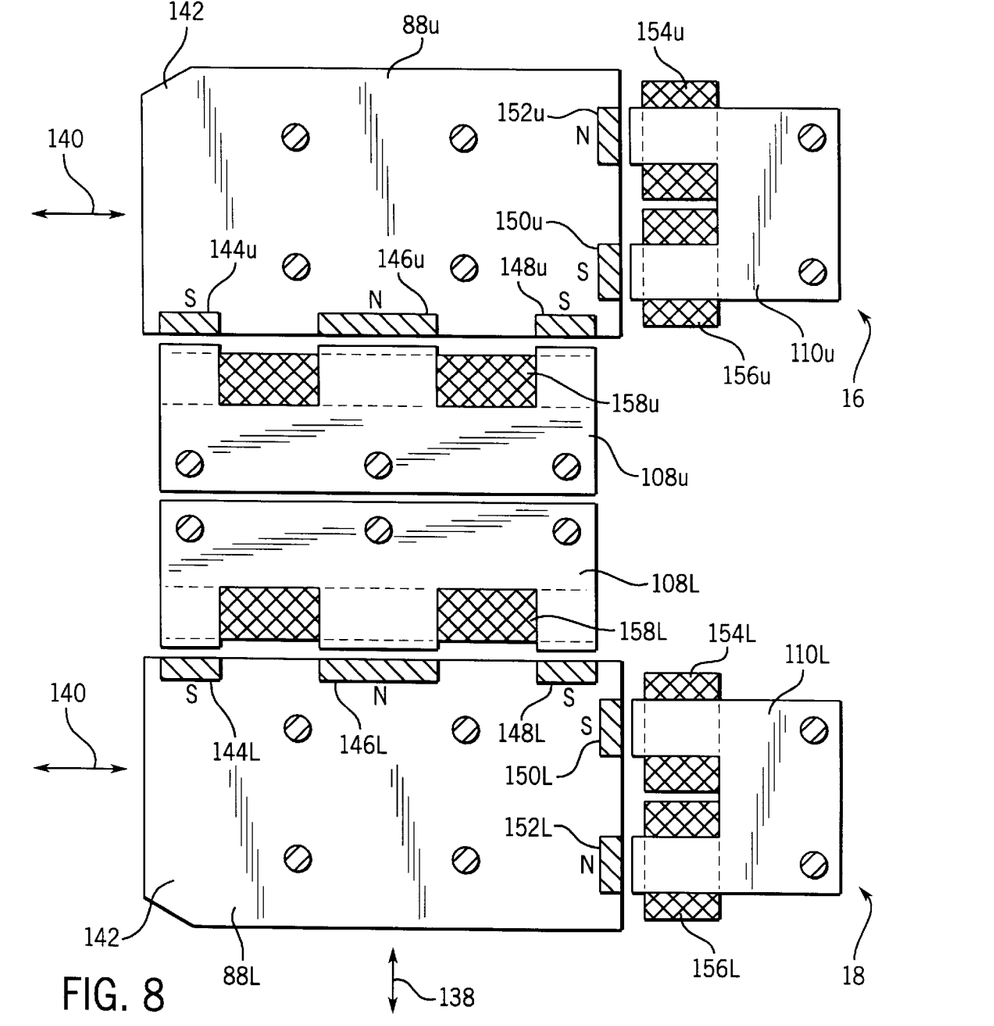
FIG. 8 is a detailed view of the active damping system taken along line 8—8 in FIG. 7.

Referring now to FIG. 8, the electromagnets 108U, 108L provide vertical force on the respective tuned mass 88U, 88L as depicted by double-headed 30 arrow 138. Electromagnets 110U, 110L provide force on the respective tuned mass 88U, 88L in the horizontal direction as depicted by double-headed arrows 140. The tuned masses 88U, 88L are fabricated from a plurality of thin metal sheets 142 which are disposed vertically and laminated together. The thin metal sheets 142 are aligned generally along the direction of the magnetic field generated by the electromagnetic actuators 108U, 110U and 108L, 110L. The tuned masses 88U, 88L also include a plurality of permanent magnets 144U, 146U, 148U, 150U, 152U for the upper tuned mass 88U; and 144L, 146L, 148L, 150L, 152L for the lower tuned mass 88L, respectively. The thin metal sheets for the tuned masses 88U and 88L are cut to provide recesses in which the permanent magnets are seated and secured with adhesive.

If the tuned masses 88U, 88L are not fabricated from a plurality of aligned, laminated metal plates, the changing magnetic fields in the respective tuned masses 88U, 88L will induce eddy currents in the mass which is likely to create significant heat. Such heat would likely degrade the adhesive used to secure the magnets to the tuned mass, and may also cause problems with respect to cooling system components located within box 52 (see FIG. 1) as previously mentioned. While the invention can be implemented using tuned masses without permanent magnets, it is desired to embed permanent magnets in the tuned masses 88U, 88L so that the electromagnetic actuators 108U, 110U, 108L, 110L can both push and pull on the tuned mass.

Electromagnets 110U and 110L are C-type electromagnets each having a coil 154U, 156U, 154L, 156L, around each arm of the respective electromagnet 110U, 110L. The coils 154U and 156U on electromagnet 110U are connected in series, as are the coils 154L, 156L on the electromagnet 110L. Alternatively, a single coil can be used for each C-type electromagnet 110U, 110L (i.e., around only one arm). The electromagnets 108U, 108L are E-type electromagnets each including a single coil 158U, 158L around the center arm for the respective electromagnet 108U, 108L. Typically, each of the coils 154U, 154L, 156U, 156L, 158U, 158L has approximately 100 turns to provide appropriate actuator output. Permanent magnets 152U and 146U on the upper tuned mass 88U, and 152L and 146L on the lower tuned mass 88L, have north polarity. The other permanent magnets (150U, 148U, 144U, 150L, 148L, 144L) on the tuned mass 88U, 88L have south polarity. The permanent magnets on each tuned mass 88U, 88L are arranged adjacent to one of the respective electromagnet arms, and are appropriately located to coordinate the direction of magnetic force on the respective tuned mass 88U, 88L from the respective electromagnet. For instance, permanent magnets 152U and 150U adjacent the upper C-type electromagnet 110U have opposite polarity to correspond to the opposite polarity of the arms of the C-type electromagnet 110U, thus providing force in the same direction on the tuned mass 88U when energy is applied to the electromagnet 110U. Likewise, permanent magnet 146U adjacent to the middle arm of the E-type electromagnet 108U has the opposite polarity of permanent magnets 144U and 148U adjacent the outer arms for the E-type electromagnet 108U. Thus, each arm of the E-type electromagnet 108U provides force in the same direction on the tuned mass 88U when energy is applied to the electromagnet 108U.

FIG. 10 schematically illustrates the operation of a one-dimensional active tuned mass vibration damping system in accordance with the invention. As shown in FIG. 10, the electronic control unit 100 inputs a signal from the vibration sensor 94 for the knife cylinder through line 114, and inputs a signal from the vibration sensor 106 for the tuned mass 88 through line 116. For each sampling period, the electronic control unit 100 outputs a command signal to the actuator 108 through line 118. The actuator 108 provides a force (depicted as dashed arrow 120) on the tuned mass 88 in response to the command signal (line 118) from the electronic control unit 100. The tuned mass 88 is coupled to the knife cylinder via the spring arm 112 and retainer ring 70 (depicted as arrows 122).

The electronic control unit 100 is preferably a digital signal processor operating at a sampling rate of approximately 4000 Hz, although the optimum sampling rate may vary with respect to the specific application. The digital signal processor 100 includes the appropriate A/D and D/A converters to communicate with the analog accelerometers 96, 98 and actuators 108. The electronic control unit 100 preferably implements a state space control system to generate the command signal in line 118. The preferred state space control system includes a knife cylinder observer 124, a tuned mass observer 126, and a controller 128. The knife cylinder observer 124 inputs a discrete signal (through the respective A/D converter) from the knife vibration sensor 94 during each sampling period k, and outputs state signals, lines 130 and 132, for the knife cylinder for the subsequent sampling period k+1. Likewise, the tuned mass observer inputs a discrete signal (through the respective A/D converter) from the tuned mass vibration sensor 106 during each sampling period k, and outputs state signals for the tuned mass, lines 134, 136, for the subsequent sampling period k+1. The controller 128 inputs the state signals, lines 130, 132, 134, 136, for each sampling period, and outputs a command signal (through a D/A converter) for each sampling period that is used to control the actuator 108, line 118. As previously explained, the knife vibration sensor 94 and the tuned mass vibration sensor 106 are preferably accelerometers. In this preferred system, the state signals outputting the knife cylinder observer 124 and the tuned mass observer 126 are signals representing position and velocity of the respective sensors 94, 106. More specifically, the state signals outputting the knife cylinder observer 124 shown schematically as lines 130, 132 are a knife cylinder velocity signal for the subsequent sampling period (i.e. CylVel(k+1)) and a knife cylinder position signal for the subsequent sampling period (i.e. CylPos(k+1)). The preferred knife cylinder observer 124 is given by the following expressions:

$$CylPos(k+1) = K_{P1,cyl} * CylPos(k) + K_{P2,cyl} * CylVel(k) + K_{P3,cyl} * CylAcc(k)$$

$$CylVel(k+1) = K_{V1,cyl} * CylPos(k) + K_{V2,cyl} * CylVel(k) + K_{V3,cyl} * CylAcc(k)$$

where CylAcc(k) represents the value of the cylinder acceleration as measured by the knife vibration sensor 94 for sample period k, CylVel(k) represents the calculated cylinder velocity for sample period k, CylPos(k) represents the calculated cylinder position for sample period k, coefficients $K_{P1,cyl}$, $K_{P2,cyl}$, $K_{P3,cyl}$, $K_{V1,cyl}$, $K_{V2,cyl}$, $K_{V3,cyl}$ are preselected constant values, CylPos(k+1) represents the calculated cylinder position for the subsequent sampling period k+1, and CylVel(k+1) represents the calculated cylinder velocity for the subsequent sampling period k+1.

In a similar manner, the state signals outputting the tuned mass observer 126 shown schematically as lines 134 and 136 are a tuned mass velocity signal for the subsequent sampling period (i.e. TMVel(k+1)) and a tuned mass position signal for the subsequent sampling period (i.e. TMPos (k+1)). The preferred tuned mass observer 126 is given by the following expressions:

$$TMPos(k+1)=K_{P1,TM}*TMPos(k)+K_{P2,TM}*TMVel(k)+K_{P3,TM}*TMAcc(k)$$

$$TMVel(k+1)=K_{V1,TM}*TMPos(k)+K_{V2,TM}*TMVel(k)+K_{V3,TM}*TMAcc(k)$$

where TMAcc(k) represents the value of the tuned mass acceleration as measured by the tuned mass vibration sensor 106 for sample period k, TMVel(k) represents the calculated tuned mass velocity for sample period k, TMPos(k) represents the calculated tuned mass position for sample period k, coefficients $K_{P1,TM}$, $K_{P2,TM}$, $K_{P3,TM}$, $K_{V1,TM}$, $K_{V2,TM}$, $K_{V3,TM}$ are preselected constant values, TMPos(k+1) represents the calculated tuned mass position for the subsequent sampling period k+1, and TMVel(k+1) represents the calculated tuned mass velocity for the subsequent sampling period k+1.

It is desirable to select the coefficients for the observers 124, 126 so that the observers 124, 126 provide a suitable convergence time for estimating accurate state signal output, yet provide slow enough adaptation to effectively filter random noise from the signals from the respective vibration sensors 94, 106. In other words, the observers 124, 126 in addition to calculating velocity and position from acceleration signals, are bandpass filters that pass signals near the first natural frequency (e.g. approximately 50 Hz) and reject the higher order natural frequencies. In most cases, the knife cylinder observer 124 will be mathematically identical to the tuned mass observer 126.

The preferred controller 128 inputs the state signals from the observers 124, 126 and outputs a command signal for each sampling period k in accordance with the following expression:

$$Cmd(k)=C_{P,cyl} CylPos(k)+C_{P,TM} TMPos(k)+C_{V,cyl} CylVel(k)+C_{V,TM} TMVel(k)$$

where Cmd(k) is the command signal output from the controller for sampling period k, CylPos(k) is the cylinder position for sample period k calculated by the knife cylinder observer 124, TMPos(k) is the tuned mass position for sample period k calculated by the tuned mass observer 126, CylVel(k) is the velocity of the cylinder for sample period k as calculated by the knife cylinder observer 124, TMVel(k) is the velocity of the tuned mass at sample period k as calculated by the tuned mass observer 126, and coefficients $C_{P,cyl}$, $C_{P,TM}$, $C_{V,cyl}$ and $C_{V,TM}$ are preselected constants. Note that it is desirable to select the coefficients $C_{P,cyl}$, $C_{P,TM}$, $C_{V,cyl}$ and $C_{V,TM}$ to account for phase shifts occurring in the system. It has been found that significant phase lags occur in actuating the electromagnetic actuators 108 and/or 110, and thus it will normally be important to account for phase shifts in the system to maintain system stability. As previously mentioned, the preferred control scheme is disclosed in detail in the above-referenced copending patent application entitled "Phase Shift Accommodator For Active Tuned Mass Damping System", by James Michler, assigned to the assignee of the present application, filed on even date herewith. Briefly, the coefficients ($C_{P,cyl}$; $C_{P,TM}$; $C_{V,cyl}$; $C_{V,TM}$) for the preferred controller 128 are selected preliminarily in accordance with the Ricatti equation to provide a linear combination that models the behavior of the rotary knife with the spring arm and tuned mass attached thereto, and are then adjusted to account for phase shifts in the system.

While the specific value of the constants for the observers 124, 126 and the controller 128 depend on the particular rotary knife, a prototype system developed by the assignee uses the following values for coefficients:

| Coefficients | Value (units) |
|---|---|
| $K_{P1}$ | 0.921 (none) |
| $K_{P2}$ | 0.000233 (s) |
| $K_{P3}$ | 8.40 × $10^7$ (s) |
| $K_{V1}$ | −21.86 (1/s) |
| $K_{V2}$ | 0.995 (none) |
| $K_{V3}$ | 9.7 × $10^4$ (s) |
| $C_{P,cyl}$ | 10860 (lb/$s^2$) |
| $C_{P,TM}$ | −253.9 (lb/$s^2$) |
| $C_{V,cyl}$ | 14.82 (lb/s) |
| $C_{V,TM}$ | 2.25 (lb/s) |

Using the above coefficients, it is desirable to scale the command signal CMD(k) by a factor of 10.8 before outputting the signal through line 118 to the actuator 108.

It may be desirable to implement the invention as described thus far on a single knife cylinder in a single dimension (e.g. to attenuate vertical vibrations), on a single knife cylinder in two dimensions (e.g. to attenuate both vertical and horizontal vibrations), or on both the upper 12 and lower 14 cylinders in one and/or two dimensions. All such implementations are contemplated within the scope of the invention.

Figure 11:
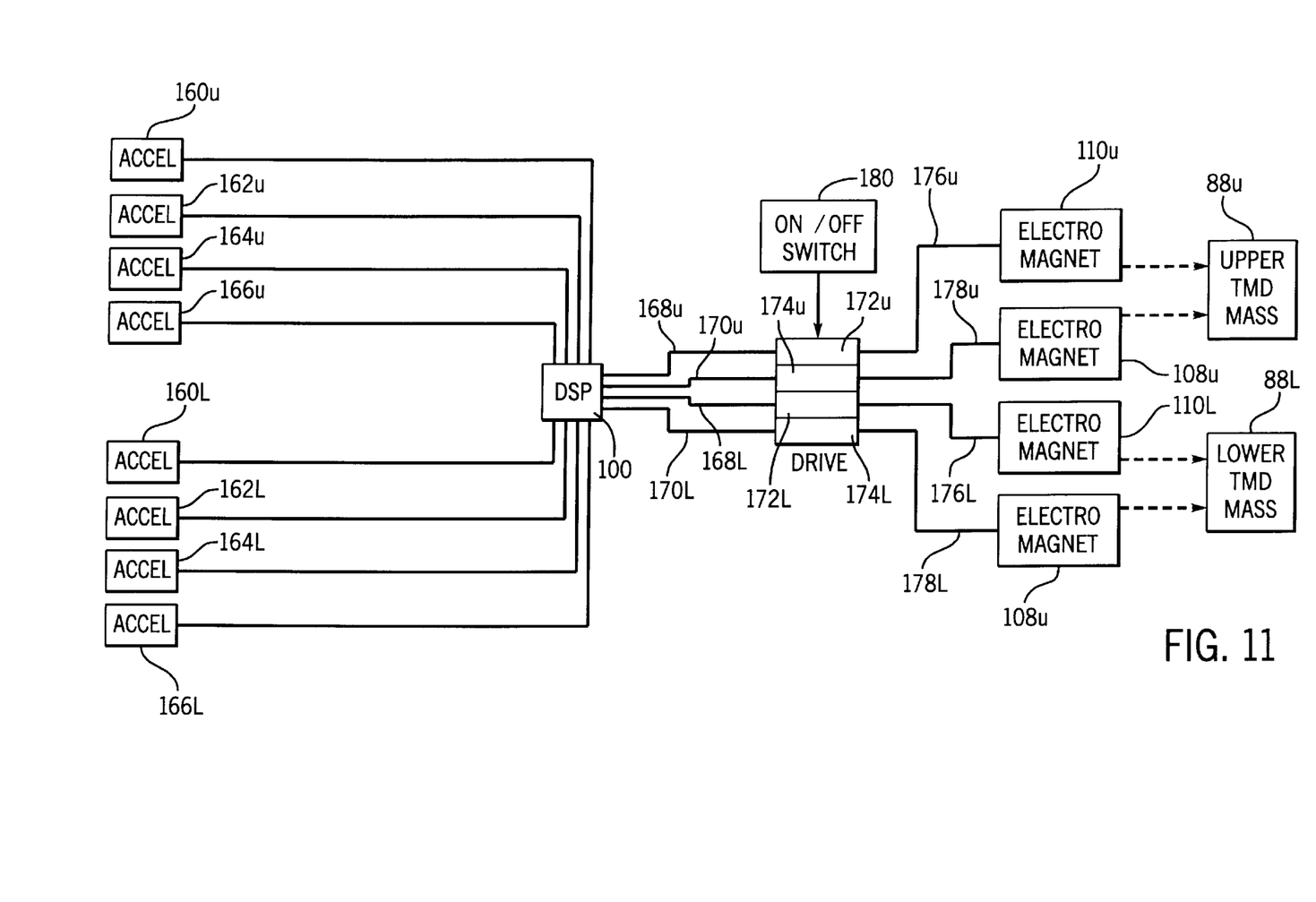
FIG. 11 is a schematic drawing illustrating a control system for implementing a two-dimensional active tuned mass vibration damping system on both the upper and lower rotary knife cylinders.

FIG. 11 illustrates a system in which vibrations are attenuated in two dimensions on both the upper 12 and lower 14 cylinder. Referring now to FIG. 11, the digital signal processor 100 receives analog signals from eight accelerometers 160U, 162U for the upper tuned mass 88U, and 164U, 166U for the upper cylinder 12; and 160L, 162L for the lower tuned mass 88L, and 164L, 166L for the lower cylinder 14. By way of example, accelerometer 160U monitors horizontal vibrations in the upper tuned mass 88U, accelerometer 162U monitors vertical vibrations in the upper tuned mass 88U, accelerometer 164U monitors horizontal vibrations in the upper stationary support shaft 20, and accelerometer 166U measures vertical vibrations in the upper stationery support shaft 20. Likewise, accelerometer 160L monitors horizontal vibrations in the lower tuned mass 88L, accelerometer 162L monitors vertical vibrations in the lower tuned mass 88L, accelerometer 164L monitors horizontal vibrations in the lower stationary support shaft 22, and accelerometer 166L monitors vertical vibrations in the lower stationary support shaft 22. For each electromagnetic actuator 108U, 110U, 108L, 110L, the digital signal processor includes two observers 124, 126 and a controller 128 as depicted in FIG. 10. In other words, each electromagnetic actuator 108U, 110U, 108L, 110L has a dedicated control system which receives accelerometer input from two accelerometers. In FIG. 11, the control algorithm (i.e. observers 124, 126 and controller 128) for the electromagnetic actuator 110U receives inputs from accelerometers 160U and 164U. The command signal for electromagnetic actuator 110U is output from the digital signal processor in line 168U to an electronic driver/amplifier 172U which provides the appropriate electrical current to the electromagnetic actuator 110U through line 176U. In a similar manner, electromagnetic actuator 108U is controlled in response to the signals from accelerometers 162U, 166U. The digital signal processor 100 outputs the command signal in line 170U to an electronic driver/amplifier 174U which outputs an appropriate electrical current to the electromagnetic actuator 108U through line 178U.

Electromagnetic actuator 110L is controlled in response to the signal from accelerometer 160L and accelerometer 164L. The digital signal processor 100 outputs the respective command signal in line 168L to an electronic driver/amplifier 172L which outputs the appropriate electrical current in line 176L to the electromagnetic actuator 110L. The electromagnetic actuator 108U is controlled in response to signals from accelerometer 162L and accelerometer 166L. The digital signal processor 100 outputs the respective command signal in line 170L to an electronic driver/amplifier 174L which outputs the appropriate amount of electrical current in line 178L to the electromagnetic actuator 108U. A common on/off switch 180 is preferably provided for all of the driver/amplifiers 172U, 174U, 172L, 174L, thus enabling the entire system to be shut down contemporaneously.

It should be pointed out that the invention has been disclosed with respect to the preferred embodiments of implementing the invention. It may be possible, however, to implement the invention in modified form. Such modifications, or various alternatives and equivalents should be considered to fall within the scope of the following claims.

I claim:

1. A rotary knife for cutting a plurality of individual sheets in succession from a longitudinally traveling continuous web of material, the rotary knife comprising:
    a frame;
    a first tubular rotatable knife cylinder and a second tubular rotatable knife cylinder, each of the tubular knife cylinders having a blade mounted on an outer cylindrical wall of the respective knife cylinder, the blades engaging each other as the tubular knife cylinders rotate to cut the web;
    a first stationary support shaft located concentrically within the first tubular knife cylinder and fixed to the frame;
    support bearings located between the first stationary support shaft and the first tubular knife cylinder to rotatably support the first tubular knife cylinder on the first stationary support shaft; and
    an active tuned mass damping system for the first knife cylinder including
        a tuned mass,
        a spring arm having one end coupled to the tuned mass and another end coupled to the first stationary support shaft,
        a knife vibration sensor that monitors vibration of the first knife cylinder and generates a signal in response thereto,
        a tuned mass vibration sensor that monitors vibration of the tuned mass and generates a signal in response thereto,
        an electronic control unit that inputs the signals from the first knife vibration sensor and the tuned mass vibration sensor and outputs one or more command signals, and
        an actuator that provides a force on the tuned mass in response to the one or more command signals from the electronic control unit.

2. A rotary knife as recited in claim 1 wherein the electronic control unit for the active tuned mass damping system is a digital signal processor.

3. A rotary knife as recited in claim 1 wherein:
    the recited knife vibration sensor is a primary first knife vibration sensor that monitors vibrations of the first knife cylinder occurring in a primary direction which is perpendicular to a rotation axis of the first knife cylinder,
    the recited tuned mass vibration sensor is a primary tuned mass vibration sensor that monitors vibrations of the tuned mass occurring in the same primary direction as the primary first knife vibration sensor,
    the recited actuator is a first actuator that provides force on the tuned mass in the same primary direction as monitored by the primary first knife vibration sensor and the primary tuned mass vibration sensor, and
    the active tuned mass damping system for the first knife cylinder further includes:
        a secondary first knife vibration sensor that monitors vibrations of the first knife occurring in a secondary direction which is perpendicular to the rotation axis of the first knife cylinder and is rotated from the primary direction by at least 45°, and generates a signal in response thereto;
        a secondary tuned mass sensor that monitors vibrations of the tuned mass occurring in the same secondary direction as the secondary first knife vibration sensor, and generates a signal thereto;
    wherein the electronic control unit also receives the signals from the secondary first knife vibration sensor and the secondary tuned mass vibration sensor, and the tuned mass damping system for the first knife cylinder further includes a second actuator that provides a force on the tuned mass in the secondary direction in response to one or more command signals from the electronic control unit.

4. A rotary knife as recited in claim 3 wherein mechanical tuning of the tuned mass is a compromise between optimum tuning for the primary direction and optimum tuning for the secondary direction.

5. A rotary knife as recited in claim 3 wherein the primary direction is generally vertical and the secondary direction is generally horizontal.

6. A rotary knife as recited in claim 3 wherein both the primary and secondary first knife vibration sensors are located within the first stationary support shaft and measure vibration of the first stationary support shaft to monitor the vibration of the first knife cylinder.

7. A rotary knife as recited in claim 6 wherein the first stationary support shaft has a first end and a second end both fixed to the frame and both the primary and secondary first knife vibration sensors are placed within the first stationary support shaft at a location 20% to 80% between a location at which the first end of the shaft is fixed to the frame and a location at which the second end of the shaft is fixed to the frame.

8. A rotary knife as recited in claim 6 wherein the primary and secondary first knife vibration sensors are placed within the first stationary support shaft at a location approximately equidistant between a location at which the first end of the shaft is fixed to the frame and a location at which the second end of the shaft is fixed to the frame.

9. A rotary knife as recited in claim 1 wherein the first knife vibration sensor is located within the first stationary support shaft and measures vibration of the first stationary support shaft to monitor vibration of the first knife cylinder.

10. A rotary knife as recited in claim 9 wherein the first stationary support shaft has a first end and a second end both fixed to the frame and the first knife vibration sensor is placed within the first stationary support shaft at a location 20% to 80% between the location at which the first end of the shaft is fixed to the frame and the location at which the second end of the shaft is fixed to the frame.

11. A rotary knife as recited in claim 10 wherein the first vibration sensor is placed within the first stationary support shaft at a location approximately equidistant between the location at which the first end of the shaft is fixed to the frame and the location at which the second end of the shaft is fixed to the frame.

12. A rotary knife as recited in claim 1 wherein the actuator in the active tuned mass damping system for the first knife cylinder is an electromagnet that is actuated to provide force on the tuned mass.

13. A rotary knife as recited in claim 12 wherein a plurality of permanent magnets are affixed to the tuned mass.

14. A rotary knife as recited in claim 12 wherein the tuned mass comprises a plurality of thin metal sheets laminated together to form the tuned mass, the thin metal sheets being aligned generally along the direction of a magnetic field generated by the electromagnetic actuator.

15. A rotary knife as recited in claim 1 wherein the tuned mass and the spring arm are selected so that a tuned frequency of the tuned mass is slightly less than a natural resonance frequency of the system for the first knife cylinder absent the tuned mass and spring arm.

16. A rotary knife as recited in claim 1 wherein:
a retainer mount for a first end of the first stationary support shaft is mounted to the frame and the first end of the first stationary support shaft is fixed to the frame by mounting the first end of the shaft to the retainer mount; and
the spring arm is coupled to the first stationary support shaft by bolting a mounting flange on the spring arm tightly to the retainer mount for the first stationary support shaft.

17. A rotary knife as recited in claim 1 wherein the spring arm has a tapered stem.

18. A rotary knife as recited in claim 1 wherein the knife vibration sensor is an accelerometer and the tuned mass vibration sensor is an accelerometer.

19. A rotary knife as recited in claim 1 wherein the electronic control unit implements a state space control system to generate the command signal.

20. A rotary knife as recited in claim 19 wherein the state space control system includes:
a knife cylinder observer that inputs a discrete signal from the knife vibration sensor during each sampling period and outputs state signals for the first knife cylinder for the subsequent sampling period;
a tuned mass observer that inputs a discrete signal from the tuned mass vibration sensor during each sampling period and outputs state signals for the tuned mass for the subsequent sampling period; and
a controller that inputs the state signals for each sampling period and outputs a respective command signal for each sampling period that is used to control the actuator.

21. A rotary knife as recited in claim 20 wherein:
the knife vibration sensor and the tuned mass vibration sensor are accelerometers;
the state signals outputting the knife cylinder observer are a knife cylinder velocity signal for the subsequent sampling period and a knife cylinder position signal for the subsequent sampling period; and
the state signals outputting the tuned mass observer are a tuned mass velocity signal for the subsequent sampling period and a tuned mass position signal for the subsequent sampling period.

22. A rotary knife as recited in claim 20 wherein the observers are selected in a manner to provide a suitable convergence time for estimating accurate state signal output yet provide slow enough adaptation to effectively filter random noise in the signals from the vibration sensors from substantially affecting the estimated state signal output for the subsequent sampling period.

23. A rotary knife as recited in claim 20 wherein the controller is selected preliminarily in accordance with the Ricatti Equation to provide a linear combination that models behavior of the rotary knife with the spring arm and tuned mass attached thereto, and is adjusted to account for phase shifts in the system.

24. A rotary knife as recited in claim 20 wherein the knife cylinder observer and the tuned mass observer are mathematically identical.

25. A rotary knife as recited in claim 20 wherein the knife vibration sensor is an accelerometer, the state signal outputting the knife cylinder observer are a knife cylinder velocity signal for the subsequent sampling period and a knife cylinder position signal for the subsequent sampling period, and the knife cylinder observer is given by the following expressions:

$$CylPos(k+1)=K_{P1,cyl}*CylPos(k)+K_{P2,cyl}*CylVel(k)+K_{P3,cyl}*CylAcc(k)$$

$$CylVel(k+1)=K_{V1,cyl}*CylPos(k)+K_{V2,cyl}*CylVel(k)+K_{V3,cyl}*CylAcc(k)$$

where CylAcc(k) represents the value of the cylinder acceleration as measured by the knife vibration sensor for sample period k, CylVel(k) represents the calculated cylinder velocity for sample period k, CylPos(k) represents the calculated cylinder position for sample period k, coefficients $K_{P1,cyl}$, $K_{P2,cyl}$, $K_{P3,cyl}$, $K_{V1,cyl}$, $K_{V2,cyl}$, $K_{V3,cyl}$ are preselected constant values, CylPos(k+1) represents the calculated cylinder position for the subsequent sampling period k+1, and CylVel (k+1) represents the calculated cylinder velocity for the subsequent sampling period k+1.

26. A rotary knife as recited in claim 20 wherein the tuned mass vibration sensor is an accelerometer, the state signals outputting the tuned mass observer are a tuned mass velocity signal for the subsequent sampling period and a tuned mass position signal for the subsequent sampling period, and the tuned mass observer is given by the following expressions:

$$TMPos(k+1)=K_{P1,TM}*TMPos(k)+K_{P2,TM}*TMVel(k)+K_{P3,TM}*TMAcc(k)$$

$$TMVel(k+1)=K_{V1,TM}*TMPos(k)+K_{V2,TM}*TMVel(k)+K_{V3,TM}*TMAcc(k)$$

where TMAcc(k) represents the value of the tuned mass acceleration as measured by the knife vibration sensor for sample period k, TMVel(k) represents the calculated tuned mass velocity for sample period k, TMPos(k) represents the calculated tuned mass position for sample period k, coefficients $K_{P1,TM}$, $K_{P2,TM}$, $K_{P3,TM}$, $K_{V1,TM}$, $K_{V2,TM}$, $K_{V3,TM}$ are preselected constant values, TMPos(k+1) represents the calculated tuned mass position for the subsequent sampling period k+1, and TMVel(k+1) represents the calculated tuned mass velocity for the subsequent sampling period k+1.

27. A rotary knife as recited in claim 25 wherein the tuned mass vibration sensor is an accelerometer, the state signals outputting the tuned mass observer are a tuned mass velocity signal for the subsequent sampling period and a tuned mass position signal for the subsequent sampling period, and the tuned mass observer is given by the following expressions:

$$TMPos(k+1)=K_{P1,TM}*TMPos(k)+K_{P2,TM}*TMVel(k)+K_{P3,TM}*TMAcc(k)$$

$$TMVel(k+1)=K_{V1,TM}*TMPos(k)+i\ K_{V2,TM}*TMVel(k)+K_{V3,TM}*TMAcc(k)$$

where TMAcc(k) represents the value of the tuned mass acceleration as measured by the knife vibration sensor for sample period k, TMVel(k) represents the calculated tuned mass velocity for sample period k, TMPos(k) represents the calculated tuned mass position for sample period k, coefficients $K_{P1,TM}$, $K_{P2,TM}$, $K_{P3,TM}$, $K_{V1,TM}$, $K_{V2,TM}$, $K_{V3,TM}$ are preselected constant values, TMPos(k+1) represents the calculated tuned mass position for the subsequent sampling period k+1, and TMVel(k+1) represents the calculated tuned mass velocity for the subsequent sampling period k+1; and further wherein $K_{P1,cyl}$ is substantially equal to $K_{P1,TM}$, $K_{P2,cyl}$ is substantially equal to $K_{P2,TM}$, $K_{P3,cyl}$ is substantially equal to $K_{P3,TM}$, $K_{V1,cyl}$ is substantially equal to $K_{V1,TM}$, $K_{V2,cyl}$ is substantially equal to $K_{V2,TM}$, and $K_{V3,cyl}$ is substantially equal to $K_{V3,TM}$.

28. A rotary knife as recited in claim 20 wherein the controller is given by the following expression:

$$Cmd(k)=C_{P,cyl}\ CylPos(k)+C_{P,TM}\ TMPos(k)+C_{V,cyl}\ CylVel(k)+C_{V,TM}\ TMVel(k)$$

where Cmd(k) is the command signal output from the controller for sampling period K, CylPos(k) is the cylinder position for sample period k calculated by the knife cylinder observer, TMPos(k) is the tuned mass position for sample period k calculated by the tuned mass observer, CylVel(k) is the velocity of the cylinder for sample period k as calculated by the knife cylinder observer, TMVel(k) is the velocity of the tuned mass at sample period k as calculated by the tuned mass observer, and coefficients $C_{P,cyl}$, $C_{P,TM}$, $C_{V,cyl}$ and $C_{V,TM}$ are preselected constants.

29. A rotary knife as recited in claim 28 wherein the command signal Cmd(k) is scaled before being output to drive the actuator.

30. A rotary knife as recited in claim 20 wherein the knife cylinder observer outputs two state signals and the tuned mass observer outputs two state signals, and the controller implements a linear combination of the two state signals from the knife cylinder observer and the two state signals from the tuned mass observer to calculate the respective command signal.

31. A rotary knife as recited in claim 1 further comprising:
a second stationary support shaft located concentrically within the second tubular knife cylinder and fixed to the frame;
support bearings located between the second stationary support shaft in the second tubular knife cylinder to rotatably support the second tubular knife cylinder on the second stationary support shaft; and
an active tuned mass damping system for the second knife cylinder including:
a tuned mass,
a spring arm having one end coupled to the tuned mass and another end coupled to the second stationary support shaft,
a knife vibration sensor that monitors vibration of the second knife cylinder and generates a signal in response thereto,
a tuned mass vibration sensor that monitors vibration of the tuned mass in the active damping system for the second knife cylinder and generates a signal in response thereto, and
an actuator that provides a force on the tuned mass in the active damping system for the second knife cylinder in response to one or more command signals calculated from the signals from the knife vibration sensor and the tuned mass vibration sensor for the second knife cylinder.

32. A rotary knife as recited in claim 31 wherein the signals generated by the knife vibration sensor that monitors the vibrations of the second knife cylinder and the tuned mass vibration sensor that monitors the vibrations of the tuned mass in the active damping system for the second knife cylinder input the same electronic control unit as the signals from the knife vibration sensor monitoring the vibrations of the first knife cylinder and the tuned mass vibration sensor monitoring the vibrations of the tuned mass in the active damping system for the first knife cylinder.

33. A rotary knife for cutting a plurality of individual sheets in succession from a longitudinally traveling continuous web of material, the rotary knife comprising:
a frame;
a first rotatable knife cylinder and a second rotatable knife cylinder, each of the rotatable knife cylinders having a blade mounted on an outer cylindrical wall of the respective knife cylinder, the blades engaging each other as the knife cylinders rotate to cut the web; and
an active tuned mass damping system for the first knife cylinder including:
a tuned mass coupled to the first rotatable knife cylinder,
a knife vibration sensor that monitors vibration of the first knife cylinder and generates a signal in response thereto,
a tuned mass vibration sensor that monitors vibration of the tuned mass and generates a signal in response thereto,
an electronic control unit that inputs the signals from the knife vibration sensor and the tuned mass vibration sensor and outputs one or more command signals, and
an actuator that provides a force on the tuned mass in response to the one or more command signals from the electronic control unit.

34. A rotary knife as recited in claim 33 wherein:
the recited knife vibration sensor is a primary first knife vibration sensor that monitors vibrations of the first knife cylinder occurring in a primary direction which is perpendicular to a rotation axis of the first knife cylinder, the recited tuned mass vibration sensor is a primary tuned mass vibration sensor that monitors vibrations of the tuned mass occurring in the same primary direction as the primary first knife vibration sensor, the recited actuator is a first actuator that provides force on the tuned mass in the same primary direction as monitored by the primary first knife vibration sensor and the primary tuned mass vibration sensor, and the active tuned mass damping system for the first knife cylinder further includes:
a secondary first knife vibration sensor that monitors vibrations of the first knife occurring in a secondary direction which is perpendicular to the rotation axis of the first knife cylinder and is rotated from the primary direction at least 45°, and generates a signal in response thereto;

a secondary tuned mass sensor that monitors vibrations of the tuned mass occurring in the same secondary direction as the secondary first knife vibration sensor, and generates a signal in response thereto;

wherein the electronic control unit also receives the signals from the secondary first knife vibration sensor and the secondary tuned mass vibration sensor, and the tuned mass damping system for the first knife cylinder further includes a second actuator that provides a force on the tuned mass in the secondary direction in response to the one or more command signals from the electronic control unit.

35. A rotary knife as recited in claim 34 wherein the primary direction is generally vertical and the secondary direction is generally horizontal.

36. A rotary knife as recited in claim 33 wherein the actuator in the active tuned mass damping system for the first knife cylinder is an electromagnet that is actuated to provide force on the tuned mass.

37. A rotary knife as recited in claim 36 wherein a plurality of permanent magnets are affixed to the tuned mass.

38. A rotary knife as recited in claim 36 wherein the tuned mass comprises a plurality of thin metal sheets laminated together to form the tuned mass, the thin metal sheets being aligned generally along the direction of a magnetic field generated by the electromagnetic actuator.

39. A rotary knife as recited in claim 33 wherein the tuned mass is coupled to the first knife cylinder such that a tuned frequency of the tuned mass is slightly less than a natural resonance frequency of the system for the first knife cylinder absent the tuned mass.

40. A rotary knife as recited in claim 33 wherein the electronic control unit implements a state space control system to generate the command signal.

41. A rotary knife as recited in claim 40 wherein the state space control system includes:

a knife cylinder observer that inputs a discrete signal from the knife vibration sensor during each sampling period and outputs state signals for the first knife cylinder for the subsequent sampling period;

a tuned mass observer that inputs a discrete signal from the tuned mass vibration sensor during each sampling period and outputs state signals for the tuned mass for the subsequent sampling period; and a controller that inputs the state signals for each sampling period and outputs a respective command signal for each sampling period that is used to control the actuator.

42. A rotary knife as recited in claim 41 wherein:

the knife vibration sensor and the tuned mass vibration sensor are accelerometers;

the state signals outputting the knife cylinder observer are a knife cylinder velocity signal for the subsequent sampling period and a knife cylinder position signal for the subsequent sampling period; and the state signals outputting the tuned mass observer are a tuned mass velocity signal for the subsequent sampling period and a tuned mass position signal for the subsequent sampling period.

43. A rotary knife as recited in claim 41 wherein the observers are selected in a manner to provide a suitable convergence time for estimating accurate state signal output yet provide slow enough adaptation to effectively filter random noise in the signals from the vibration sensors from substantially affecting the estimated state signal output for the subsequent sampling period.

44. A rotary knife as recited in claim 41 wherein the controller is selected preliminarily in accordance with the Ricatti Equation to provide a linear combination that models the behavior of a rotary knife with the spring arm and tuned mass attached thereto, and is adjusted to account for phase shifts in the system.

45. A rotary knife as recited in claim 41 wherein the knife vibration sensor is an accelerometer, the state signal outputting the knife cylinder observer are a knife cylinder velocity signal for the subsequent sampling period and a knife cylinder position signal for the subsequent sampling period, and the knife cylinder observer is given by the following expressions:

$$CylPos(k+1)=K_{P1,cyl}*CylPos(k)+K_{P2,cyl}*CylVel(k)+K_{P3,cyl}*CylAcc(k)$$

$$CylVel(k+1)=K_{V1,cyl}*CylPos(k)+K_{V2,cyl}*CylVel(k)+K_{V3,cyl}*CylAcc(k)$$

where CylAcc(k) represents the value of the cylinder acceleration as measured by the knife vibration sensor for sample period k, CylVel(k) represents the calculated cylinder velocity for sample period k, CylPos(k) represents the calculated cylinder position for sample period k, coefficients $K_{P1,cyl}$, $K_{P2,cyl}$, $K_{P3,cyl}$, $K_{V1,cyl}$, $K_{V2,cyl}$, $K_{V3,cyl}$ are preselected constant values, CylPos(k+1) represents the calculated cylinder position for the subsequent sampling period k+1, and CylVel(k+1) represents the calculated cylinder velocity for the subsequent sampling period k+.

46. A rotary knife as recited in claim 41 wherein the tuned mass vibration sensor is an accelerometer, the state signals outputting the tuned mass observer are a tuned mass velocity signal for the subsequent sampling period and a tuned mass position signal for the subsequent sampling period, and the tuned mass observer is given by the following expressions:

$$TMPos(k+1)=K_{P1,TM}*TMPos(k)+K_{P2,TM}*TMVel(k)+K_{P3,TM}*TMAcc(k)$$

$$TMVel(k+1)=K_{V1,TM}*TMPos(k)+K_{V2,TM}*TMVel(k)+K_{V3,TM}*TMAcc(k)$$

where TMAcc(k) represents the value of the tuned mass acceleration as measured by the knife vibration sensor for sample period k, TMVel(k) represents the calculated tuned mass velocity for sample period k, TMPos(k) represents the calculated tuned mass position for sample period k, coefficients $K_{P1,TM}$, $K_{P2,TM}$, $K_{P3,TM}$, $K_{V1,TM}$, $K_{V2,TM}$, $K_{V3,TM}$ are preselected constant values, TMPos(k+1) represents the calculated tuned mass position for the subsequent sampling period k+1, and TMVel(k+1) represents the calculated tuned mass velocity for the subsequent sampling period k+1.

47. A rotary knife as recited in claim 45 wherein the tuned mass vibration sensor is an accelerometer, the state signals outputting the tuned mass observer are a tuned mass velocity signal for the subsequent sampling period and a tuned mass position signal for the subsequent sampling period, and the tuned mass observer is given by the following expressions:

$$TMPos(k+1)=K_{P1,TM}*TMPos(k)+K_{P2,TM}*TMVel(k)+K_{P3,TM}*TMAcc(k)$$

$$TMVel(k+1)=K_{V1,TM}*TMPos(k)+K_{V2,TM}*TMVel(k)+K_{V3,TM}*TMAcc(k)$$

where TMAcc(k) represents the value of the tuned mass acceleration as measured by the knife vibration sensor for sample period k, TMVel(k) represents the calculated tuned mass velocity for sample period k, TMPos(k) represents the calculated tuned mass position for sample period k, coefficients $K_{P1,TM}$, $K_{P2,TM}$, $K_{P3,TM}$, $K_{V1,TM}$, $K_{V2,TM}$, $K_{V3,TM}$ are preselected constant values, TMPos(k+1) represents the calculated tuned mass position for the subsequent sampling period k+1, and TMVel(k+1) represents the calculated tuned mass velocity for the subsequent sampling period k+1; and further wherein $K_{P1,cyl}$ is substantially equal to $K_{P1,TM}$, $K_{P2,cyl}$ is substantially equal to $K_{P2,TM}$, $K_{P3,Cyl}$ is substantially equal to $K_{P3,TM}$, $K_{V1,cyl}$ is substantially equal to $K_{V1,TM}$, $K_{V2,Cyl}$ is substantially equal to $K_{V2,TM}$, and $K_{V3,cyl}$ is substantially equal to $K_{V3,TM}$.

48. A rotary knife as recited in claim 41 wherein the controller is given by the following expression:

$$Cmd(k)=C_{P,cyl} CylPos(k)+C_{P,TM} TMPos(k)+C_{V,cyl} CylVel(k)+C_{V,TM} TMVel(k)$$

where Cmd(k) is the command signal output from the controller for sampling period K, CylPos(k) is the cylinder position for sample period k calculated by the knife cylinder observer, TMPos(k) is the tuned mass position for sample period k calculated by the tuned mass observer, CylVel(k) is the velocity of the cylinder for sample period k as calculated by the knife cylinder observer, TMVel(k) is the velocity of the tuned mass at sample period k as calculated by the tuned mass observer, and coefficients $C_{P,cyl}$, $C_{P,TM}$, $C_{V,cyl}$ and $C_{V,TM}$ are preselected constants.

49. A rotary knife as recited in claim 48 wherein the command signal Cmd(k) is scaled before being output to drive the actuator.

50. A rotary knife as recited in claim 41 wherein the knife cylinder observer outputs two state signals and the tuned mass observer outputs two state signals, and the controller implements a linear combination of the two state signals from the knife cylinder observer and the two state signals from the tuned mass observer to calculate the respective command signal.

51. A rotary knife as recited in claim 33 further comprising:

a second stationary support shaft located concentrically within the second tubular knife cylinder and fixed to the frame;

support bearings located between the second stationary support shaft in the second tubular knife cylinder to rotatably support the second tubular knife cylinder on the second stationary support shaft; and an active tuned mass damping system for the second knife cylinder including:
a tuned mass,
a spring arm having one end coupled to the tuned mass and another end coupled to the second stationary support shaft,
a knife vibration sensor that monitors vibration of the second knife cylinder and generates a signal in response thereto,
a tuned mass vibration sensor that monitors vibration of the tuned mass in the active damping system for the second knife cylinder and generates a signal in response thereto, and
an actuator that provides a force on the tuned mass in the active damping system for the second knife cylinder in response to one or more command signals calculated from the signals from the knife vibration sensor and the tuned mass vibration sensor for the second knife cylinder.

* * * * *